United States Patent
Ludwig et al.

(10) Patent No.: US 11,875,158 B2
(45) Date of Patent: Jan. 16, 2024

(54) AUTOMATION SYSTEM AND A METHOD FOR INJECTING TRANSACTIONAL SERVICES IN AUTOMATION

(71) Applicant: SIEMENS AKTIENGESELLSCHAFT, Munich (DE)

(72) Inventors: Hartmut Ludwig, West Windsor, NJ (US); Lingyun Wang, Princeton, NJ (US)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 238 days.

(21) Appl. No.: 17/439,047

(22) PCT Filed: Feb. 18, 2020

(86) PCT No.: PCT/US2020/018619
§ 371 (c)(1),
(2) Date: Sep. 14, 2021

(87) PCT Pub. No.: WO2020/197663
PCT Pub. Date: Oct. 1, 2020

(65) Prior Publication Data
US 2022/0156091 A1 May 19, 2022

Related U.S. Application Data

(60) Provisional application No. 62/823,182, filed on Mar. 25, 2019.

(51) Int. Cl.
*G06F 9/445* (2018.01)
*G06F 9/46* (2006.01)

(52) U.S. Cl.
CPC ......... *G06F 9/44526* (2013.01); *G06F 9/466* (2013.01)

(58) Field of Classification Search
None
See application file for complete search history.

(56) References Cited

U.S. PATENT DOCUMENTS

| | | | | |
|---|---|---|---|---|
| 6,633,923 B1 * | 10/2003 | Kukura | ................... | H04L 67/10 |
| | | | | 719/316 |
| 10,284,586 B1 * | 5/2019 | Shinde | ................ | H04L 63/1433 |

(Continued)

OTHER PUBLICATIONS

PCT International Search Report and Written Opinion of International Searching Authority dated Jun. 22, 2020 corresponding to PCT International Application No. PCT/US2020/018619 filed Feb. 18, 2020.

*Primary Examiner* — Qing Chen

(57) ABSTRACT

An automation system and a method of injecting transactional services in automation is provided. The method performed by the automation system comprises providing a gatekeeper for deployment access control to determine which components can be deployed by an abstraction layer. The method further comprises providing a plugin interface between a consumer plugin associated with a first automation function and a provider plugin associated with a second automation function. The method further comprises injecting an interceptor plugin associated with a transactional service of the transactional services between the consumer plugin and the provider plugin based on an interceptor design pattern.

19 Claims, 11 Drawing Sheets

(56) References Cited

U.S. PATENT DOCUMENTS

| | | | |
|---|---|---|---|
| 2003/0229900 A1* | 12/2003 | Reisman | H04N 21/4755 |
| | | | 348/E7.071 |
| 2004/0060055 A1* | 3/2004 | Kukura | H04L 67/10 |
| | | | 719/316 |
| 2005/0065845 A1* | 3/2005 | DeAngelis | G06Q 40/00 |
| | | | 705/1.1 |
| 2007/0028300 A1 | 2/2007 | Bishop et al. | |
| 2007/0174469 A1* | 7/2007 | Andress | H04L 63/0884 |
| | | | 709/227 |
| 2008/0307088 A1* | 12/2008 | Chen | G06F 11/3495 |
| | | | 709/224 |
| 2009/0138893 A1 | 5/2009 | Borah | |
| 2009/0328067 A1* | 12/2009 | Srinivasan | G06Q 10/06 |
| | | | 717/106 |
| 2010/0083232 A1 | 4/2010 | Chouinard et al. | |
| 2012/0233668 A1* | 9/2012 | Leafe | G06F 9/44526 |
| | | | 726/4 |
| 2013/0073517 A1 | 3/2013 | Chand et al. | |
| 2014/0075433 A1* | 3/2014 | Kotton | G06F 9/5083 |
| | | | 718/1 |
| 2014/0250436 A1* | 9/2014 | Tang | G06F 9/466 |
| | | | 718/1 |

\* cited by examiner

DEVELOPMENT PHASE:
No Interceptor

DEPLOYMENT/TESTING PHASE:
Interceptor deployed
but not enabled

OPERATION PHASE:
Interceptor deployed
and enabled

AUTOMATION SYSTEM AND A METHOD FOR INJECTING TRANSACTIONAL SERVICES IN AUTOMATION

CROSS REFERENCE TO RELATED APPLICATIONS

This application claims the benefit of U.S. Provisional Application Ser. No. 62/823,182 entitled "AUTOMATION TRANSACTIONAL INTERCEPTORS AND GATE KEEPER," filed on Mar. 25, 2019, the contents of which are hereby incorporated by reference herein in their entirety.

BACKGROUND

1. Field

Aspects of the present invention generally relate to an automation system and a method for injecting transactional services in automation.

2. Description of the Related Art

Automation functions, automation equipment, and automation engineering systems and tools are all locked into the vendor specific eco-systems today. The common automation services as listed as follows, Costs calculation, Quality of Service verification, Security, Safety, Intellectual protection, Performance, key performance indicator (KPI) calculation, Versioning, Diagnostic, Prognostic, and Tracing require "transactional" knowledge of the system. For example, to implement a cost calculation service based on the movement of robot arms. The knowledge of the number of movements and the parameters (e.g. distance) of each movement is required for the calculation. Today, such services require very tight integration with the automation function program. In many cases, they are part of one monolithic body of code. Therefore, it is very difficult to develop, deploy, integrate, and enable during operation, such automation services for a given automation system, let alone reusing the developed automation services. In this document, these services are referred to as "transactional automation services" or "interceptors". Throughout this document the mechanism to manage these services will be referred to as "gatekeeper".

Due to limitations of present automation systems, the abovementioned transactional automation services are: difficult, or requires a lot of effort, to develop, integrate, deploy, enable/disable in an automation system, not possible to be deployed and enabled during run without specially engineered solution for one system and difficult to reuse the code in a different, even similar, automation systems. One common practice is to define a separate interface (e.g. DB) between automation functions and such transactional services. Extra engineering effort is required to expose and synchronize the required data from the automation functions to the services. Additional overhead and performance impact need to be assessed. Configuration of such services (e.g. enable/disable) require careful consideration. In many cases, such specially engineered services are not reusable outside the target automation program.

Therefore, there is a need for injecting transactional services (interceptors) such as QoS, safety, security, tracing, etc. in automation.

SUMMARY

Briefly described, aspects of the present invention relate to an industrial control system and an automation method to inject transactional services (interceptors) such as QoS, safety, security, tracing, etc. in automation. The system is configured to enable interceptors per automation transaction (e.g. per robot command), enable interceptors at deployment or during operation, configure the policy of injection in a separate plugin, separate automation service development from automation function development, offer services based on transactional fine details (e.g. robot arm moving distances, conveyor moving distance) and generation of such plugins with a generator. The present invention may be used for Industrial Control Systems and Edge devices.

In accordance with one illustrative embodiment of the present invention, a computer-implemented method is provided for injecting transactional services in automation. The method performed by an automation system comprises providing a gatekeeper for deployment access control to determine which components can be deployed by an abstraction layer. The method further comprises providing a plugin interface between a consumer plugin associated with a first automation function and a provider plugin associated with a second automation function. The method further comprises injecting an interceptor plugin associated with a transactional service of the transactional services between the consumer plugin and the provider plugin based on an interceptor design pattern.

In accordance with another illustrative embodiment of the present invention, an automation system is provided for injecting transactional services in automation. The system comprises a processor and an accessible memory storing an automation program comprising software instructions that when executed by the processor are configured to generate a plugin framework for the transactional services. The generated transactional services to be dynamically deployed and enabled, disabled during operation and even per automation transaction. In generated binding code of the transactional services and pre-integration, software instructions are configured to enable insertion of interceptor plugins associated with the transactional services. The software instructions are configured to provide a gatekeeper for deployment access control to determine which components can be deployed by an abstraction layer. The software instructions are configured to provide a plugin interface between a consumer plugin associated with a first automation function and a provider plugin associated with a second automation function. The software instructions are configured to inject an interceptor plugin associated with a transactional service of the transactional services between the consumer plugin and the provider plugin based on an interceptor design pattern.

In accordance with another illustrative embodiment of the present invention, a non-transitory computer-readable medium encoded with executable instructions is provided. Instructions, when executed, cause one or more automation systems to generate a plugin framework for the transactional services, wherein the generated transactional services to be dynamically deployed and enabled, disabled during operation and even per automation transaction. Instructions, when executed, in generated binding code of the transactional services and pre-integration, to enable insertion of interceptor plugins associated with the transactional services. Instructions, when executed, to provide a gatekeeper for deployment access control to determine which components can be deployed by an abstraction layer. Instructions, when executed, to provide a plugin interface between a consumer plugin associated with a first automation function and a provider plugin associated with a second automation function. Instructions, when executed, to inject an interceptor plugin associated with a transactional service of the transactional services between the consumer plugin and the provider plugin based on an interceptor design pattern.

DETAILED DESCRIPTION

Figure 1:
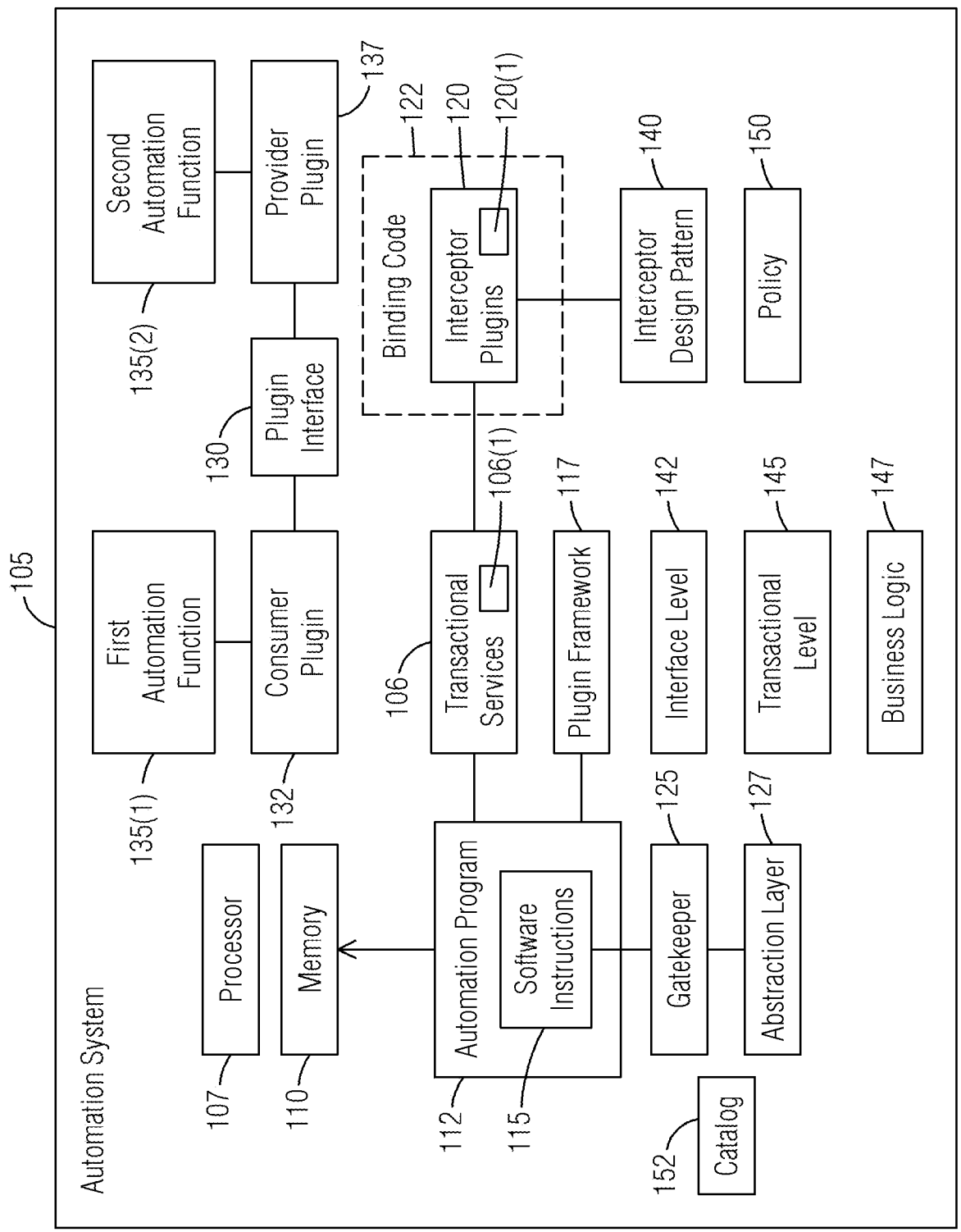
FIG. 1 illustrates a block diagram of an automation system for injecting transactional services in automation in accordance with an exemplary embodiment of the present invention.

To facilitate an understanding of embodiments, principles, and features of the present invention, they are explained hereinafter with reference to implementation in illustrative embodiments. In particular, they are described in the context of a system and a method that injects transactional services in automation. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

These and other embodiments of an automation system according to the present disclosure are described below with reference to FIGS. 1-13 herein. Like reference numerals used in the drawings identify similar or identical elements throughout the several views. The drawings are not necessarily drawn to scale.

Consistent with one embodiment of the present invention, FIG. 1 represents a block diagram of an automation system 105 for injecting transactional services 106 in automation in accordance with an exemplary embodiment of the present invention. The automation system 105 comprises a processor 107 and an accessible memory 110 storing an automation program 112 comprising software instructions 115 that when executed by the processor 107 are configured to generate a plugin framework 117 for the transactional services 106. The generated transactional services 106 to be dynamically deployed and enabled, disabled during operation and even per automation transaction. The software instructions 115 are configured to enable insertion of interceptor plugins 120 associated with the transactional services 106 in generated binding code 122 of the transactional services 106 and pre-integration.

The software instructions 115 are further configured to provide a gatekeeper 125 for deployment access control to determine which components can be deployed by an abstraction layer 127. The software instructions 115 are further configured to provide a plugin interface 130 between a consumer plugin 132 associated with a first automation function 135(1) and a provider plugin 137 associated with a second automation function 135(2). The software instructions 115 are further configured to inject an interceptor plugin 120(1) associated with a transactional service 106(1) of the transactional services 106 between the consumer plugin 132 and the provider plugin 137 based on an interceptor design pattern 140. Examples of the transactional service 106(1) include costs calculation, Quality of Service verification, security, safety, intellectual protection, performance, KPI calculation, versioning, diagnostic, prognostic and tracing.

The interceptor plugin 120(1) is configured to expose the same interfaces from the provider plugin 137 to the consumer plugin 132 as originally done and will consume the same interface from the provider plugin 137 as originally done. Once the interceptor plugin 120(1) is injected, an original binding is to be disabled and all future interactions are sent through the interceptor plugin 120(1). Injecting the interceptor plugin 120(1) includes introducing a new service without stopping the first and second automation functions 135(1, 2).

In operation, the gatekeeper 125 manages deployment, injection, rejection, enabling and disabling of the interceptor plugin 120(1) between the consumer plugin 132 and the provider plugin 137. The interception is at an interface level 142 such that the transactional services 106 are offered at a transactional level 145. The transactional services 106 can be overlaid and executed in a user defined order. A business logic 147 of the transactional services 106 can be developed independently in a programming environment of a user's choice.

Multiple interceptor plugins 120 may be deployed between plugins associated with automation functions. The multiple interceptor plugins 120 may be overlaid and applied in an order defined by a user. The multiple interceptor plugins 120 are managed by the gatekeeper 125

The gatekeeper 125 is configured for providing policy control per transaction during an automation operation. The gatekeeper 125 is configured for providing policy control such that a policy 150 includes cost calculation per transaction, security policy, plugin deployment access control, intellectual protection, Quality of Service verification, safety check per transaction per operation and user access control per transaction. The policy 150 and the transactional service 106(1) is categorized in a catalog 152 and selected by the gatekeeper 125.

The gatekeeper 125 is a software component/framework that manages injecting/removing/policy handling of a new software feature as plugin between existing consumers and providers. An abstraction layer is a concept/software framework of abstracting all automation equipment with one logical (physical asset) controller, across domains, with soft-wired automation functions. A plugin interface is an interface to allow new software features to be added through a plugin/component. A consumer plugin, in the consumer/producer software design pattern, consumes (or uses) the service provided by a producer/provider plugin. The producer and consumer are two independent processes. An automation function is an automation software feature that is abstracted from an automation equipment (typically hardware). Examples of automation functions are production planning, production scheduling, PID control loop, etc. A provider plugin is the producer software component in the consumer/producer software design pattern. An interceptor plugin is a software component that can be inserted to replace an existing communication path between a consumer and a provider. Additional processing can be done in this plugin without altering the existing interfaces to the consumer and provider. A transactional service or a transaction-based service, in which, every function call/command into the service can be recorded, metered, replayed, reverted, etc. A plugin framework is a software framework that supports loading, unloading, adding, removing of the new software feature as plugins, and supports communication between plugins. An automation transaction is a transaction-based function call as part of an automation task. The transaction means it can be recorded, metered, replayed, reverted, etc. For example, a move by a Robot arm to execute a pick and place task is an automation transaction. A binding code is a generated glue code between plugins. An interface level is the lowest level of interactions in software, the function call between plugins. A transactional level is the level of transaction-based function calls. Automation service can be offered at the transaction level (e.g. billing per robot-arm move)

Figure 2:
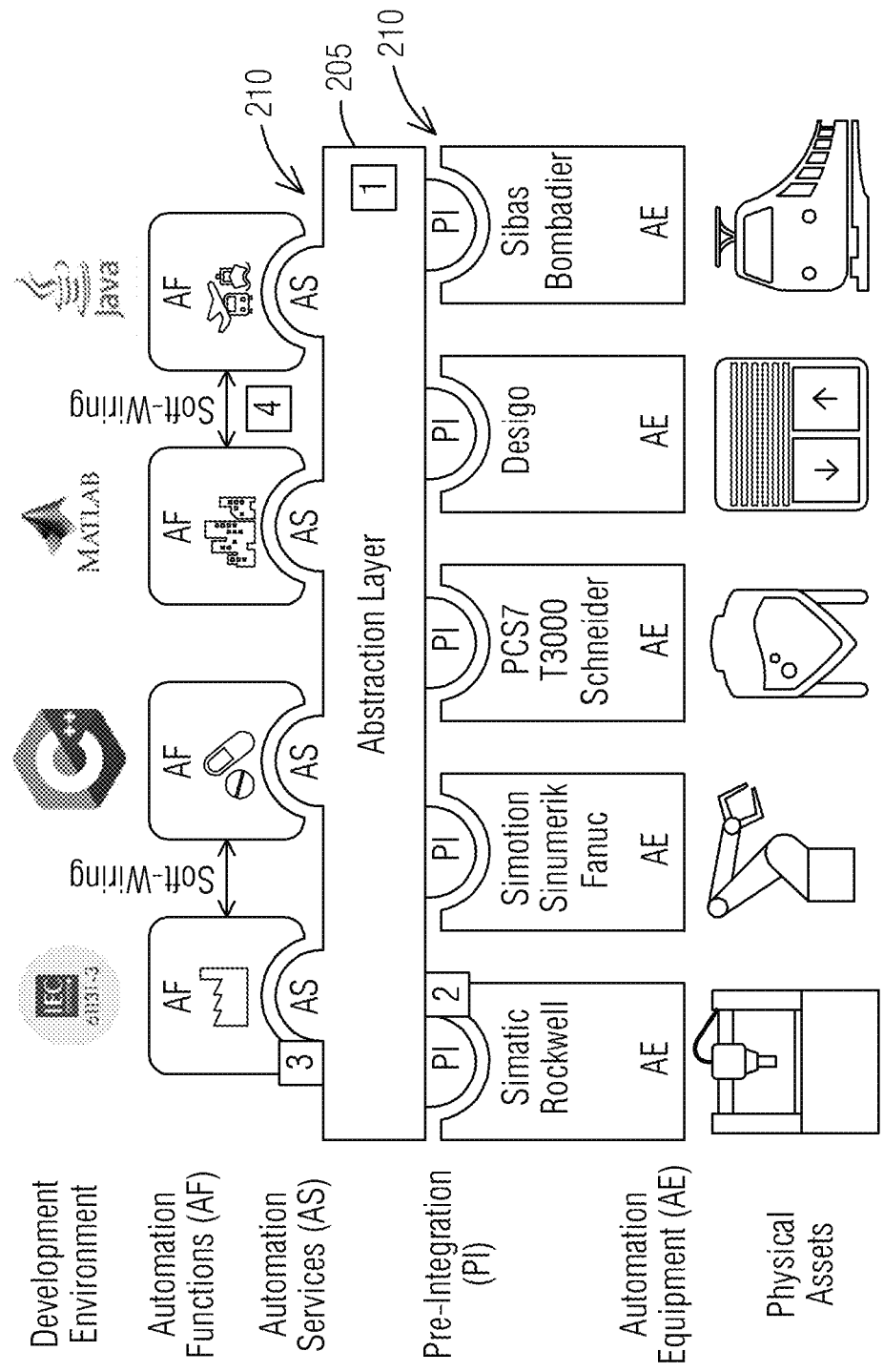
FIG. 2 illustrates a block diagram of an abstraction layer for abstracting all automation equipment with one logical (physical asset) controller, across domains, with soft-wired automation functions in accordance with an exemplary embodiment of the present invention.

Referring to FIG. 2, it illustrates a block diagram of an abstraction layer 205 for abstracting all automation equipment with one logical (physical asset) controller, across domains, with soft-wired automation functions in accordance with an exemplary embodiment of the present invention. The present invention proposes a system and a method to generate a plugin framework 210 for the aforementioned automation transactional services 106. These generated services can be dynamically deployed and enabled, disabled during operation and even per automation transaction. These transactional services 106 can be overlaid and executed in the user defined order. The business logic of these services 106 can be developed independently in a programming environment of user's choice.

Figure 3:
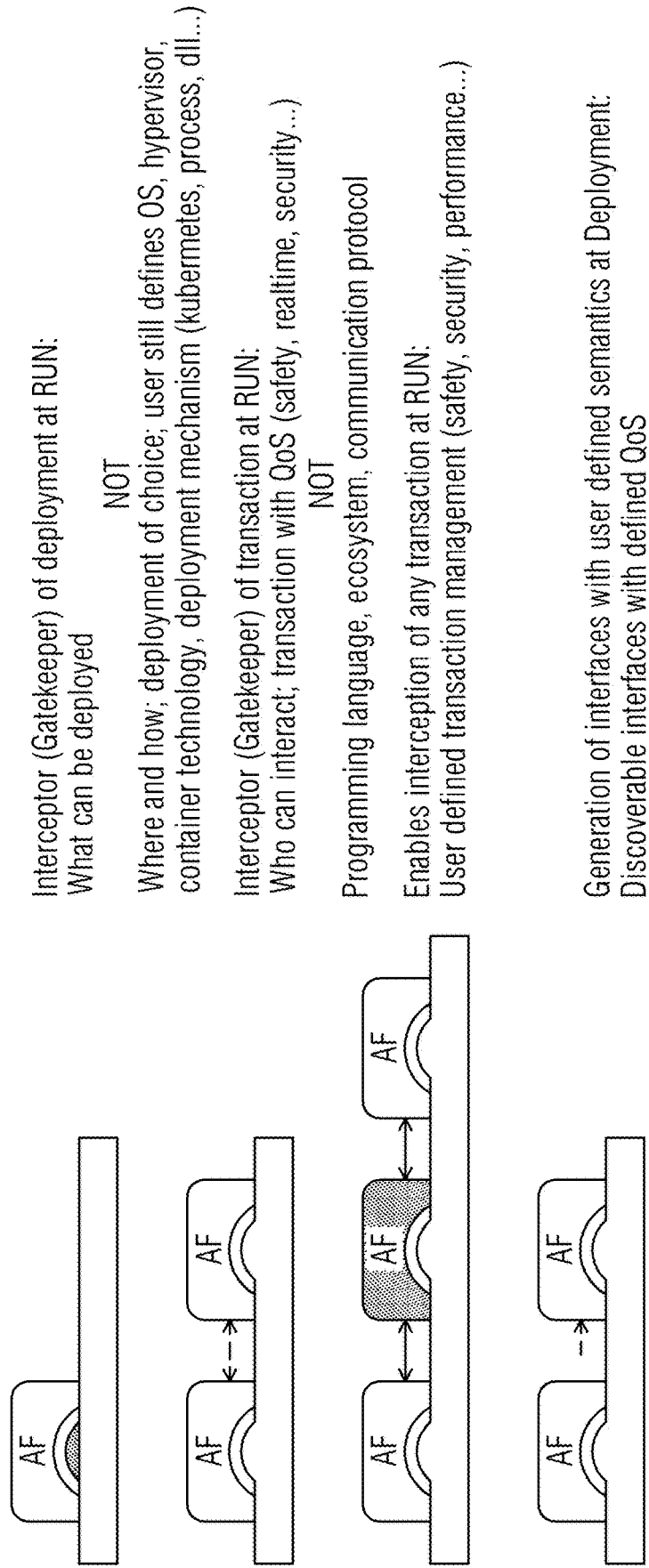
FIG. 3 shows that one example of Gatekeeper is for deployment access control, which determines which components can be deployed by the abstraction layer in accordance with an exemplary embodiment of the present invention.

Turning now to FIG. 3, it shows that one example of the gatekeeper 125 is for deployment access control, which determines which components can be deployed by the abstraction layer 205 in accordance with an exemplary embodiment of the present invention. In the generated binding code of automation service (AS) and pre-integration (PI), the system 105 can insert transactional service plugins. Another example of the gatekeeper 125 is for policy control (e.g. safety) per transaction during automation operation. And the gatekeeper functions can be enabled or disabled during operation. The details and the broader applications will be discussed in the following sections of this document. The following sections also explain how the gatekeeper 125 mechanism and the transactional services 106 can be implemented.

Figure 4:
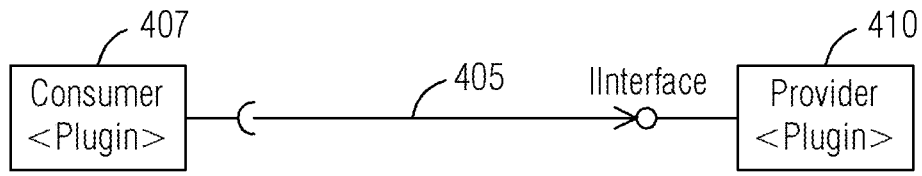
FIG. 4 illustrates a plugin interface that enables a "Consumer" to interact with a "Provider" with a binding mechanism in accordance with an exemplary embodiment of the present invention.

FIG. 4 illustrates a plugin interface 405 that enables a "consumer" plugin 407 to interact with a "provider" plugin 410 with a binding mechanism in accordance with an exemplary embodiment of the present invention. The plugin interface 405 allows the system 105 to pass data between the "consumer" plugin 407 and the "provider" plugin 410.

Figure 5:
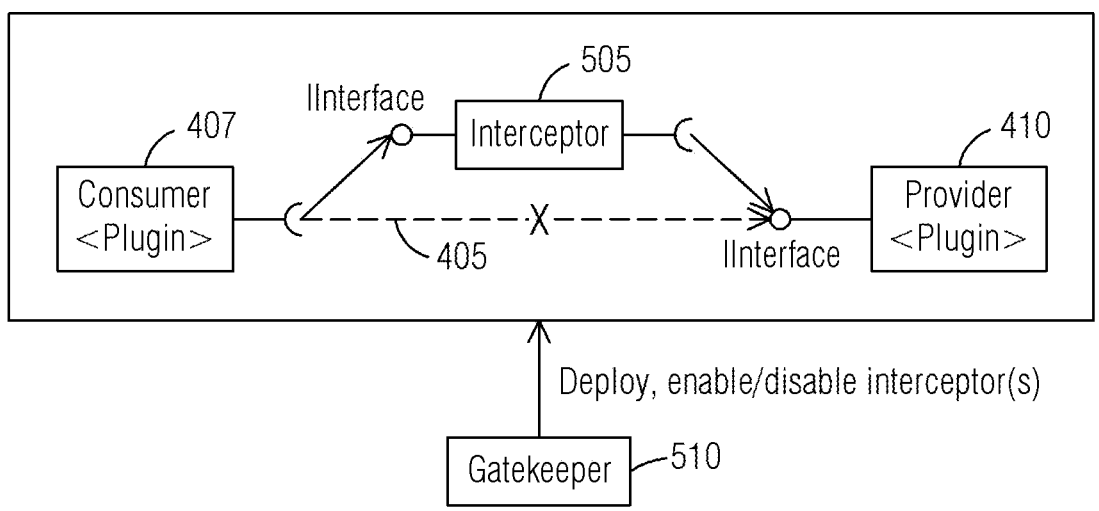
FIG. 5 illustrates a basic concept of injecting an "Interceptor" plugin between the Consumer and Provider based on Interceptor design pattern in accordance with an exemplary embodiment of the present invention.

As seen in FIG. 5, it illustrates a basic concept of injecting an "interceptor" plugin 505 between the "consumer" plugin 407 and the "provider" plugin 410 based on an interceptor design pattern in accordance with an exemplary embodiment of the present invention. The "interceptor" plugin 505 will expose the same interfaces from the "provider" plugin 410 to the "consumer" plugin 407 and will consume the same interface from the "provider" plugin 410. Once the new interceptor plugin is injected, the original binding can be disabled, and all future interactions will have to go through the interceptor plugin 505. A gatekeeper 510 manages deployment, injection, rejection, enabling and disabling the interceptors between a consumer and a provider.

Figure 6:
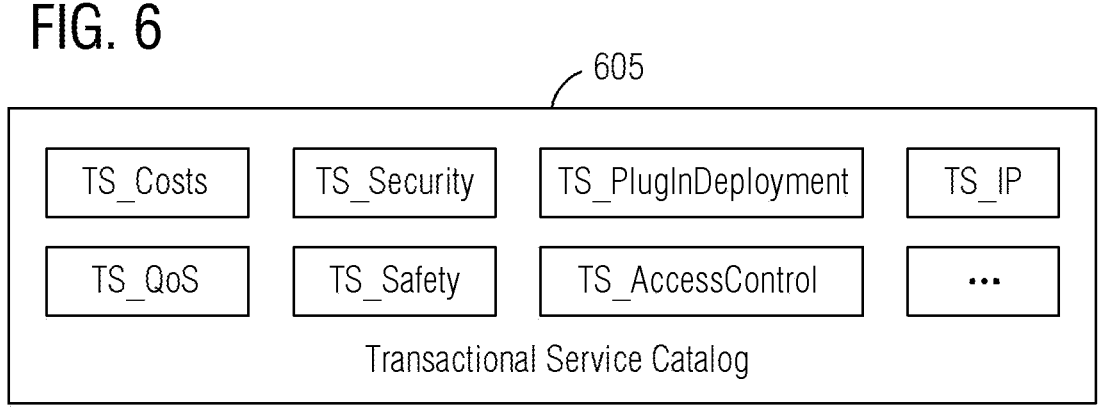
FIG. 6 illustrates a Transactional Service Catalog in accordance with an exemplary embodiment of the present invention.

As shown in FIG. 6, it illustrates a Transactional Service Catalog 605 in accordance with an exemplary embodiment of the present invention. Since the interception is at the interface level, the system 105 can offer automation services at the transactional level. The gatekeeper 125 performs policy management. The Transactional Service (TS) Catalog 605 shows the type of transactional services that can be offered.

Figure 7:
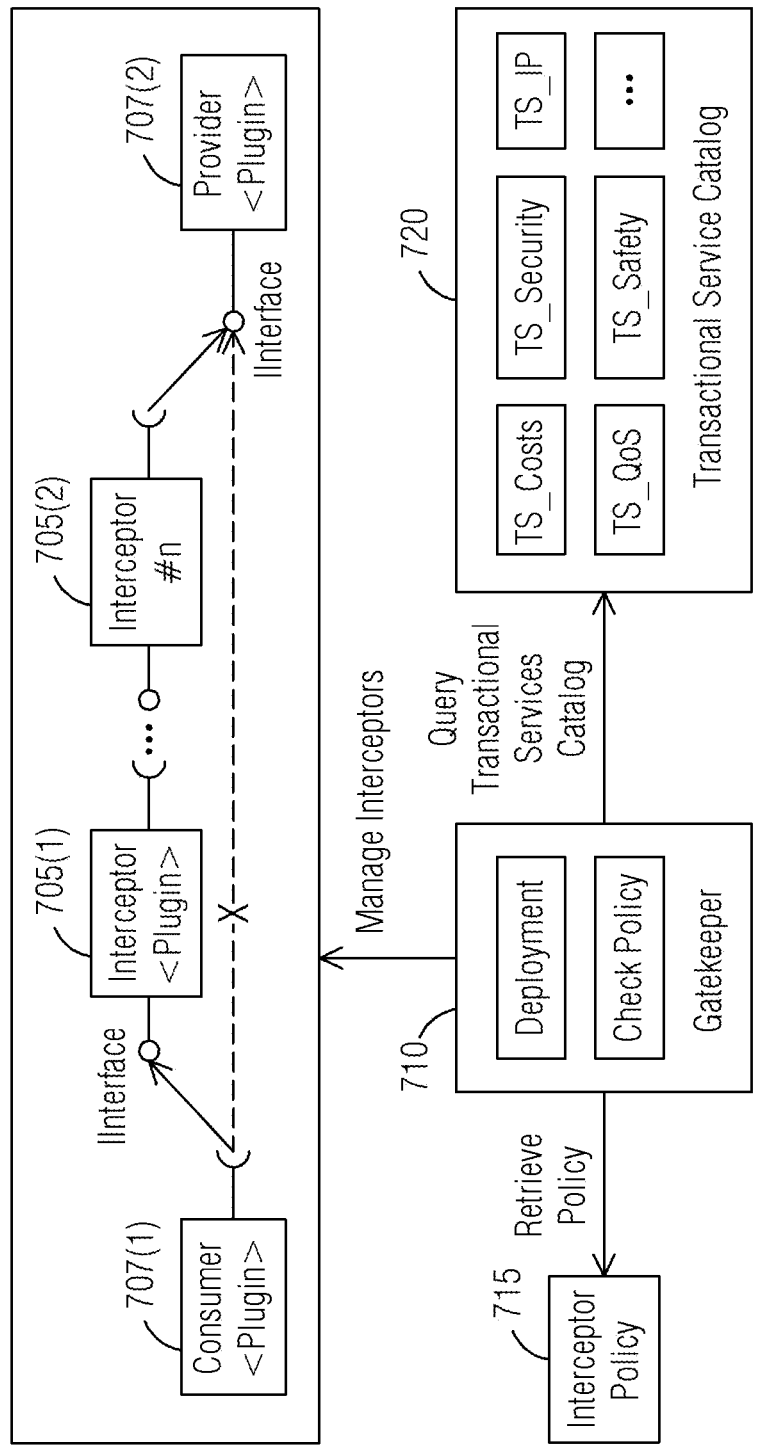
FIG. 7 illustrates multiple Interceptors can be overlaid and applied in a given order defined by the user in accordance with an exemplary embodiment of the present invention.

TS_Costs: Cost calculation per transaction
TS_Security: Security policy
TS_PluginDeployment; Plugin deployment access control
TS_IP: Intellectual protection
TS_QoS: Quality of service verification
TS_Safety: Safety check per transaction per operation
TS_AccessControl: User access control per transaction In FIG. 7, it illustrates multiple interceptors can be overlaid and applied in an order defined by the user in accordance with an exemplary embodiment of the present invention. FIG. 7 shows that one or more interceptor plugins 705(1-2) can be deployed between automation functions (plugins) 707(1-2). These can be managed in a gatekeeper 710 component. The policy how to accept, enable and disable a transactional service (interceptor) can be programmed and provided by the user. It is also a policy plugin 715 and can be generated per interceptor. The user can develop the interception policy independent of the interceptor development. The generator can also be used to generate the services, policy, and gatekeeper plugins. Interceptor/ service developers can focus on the business logic in the service (e.g. costs per KPI) instead of the integration between different systems. A Transactional Service Catalog 720 shows the type of transactional services that can be offered.

Figure 8:
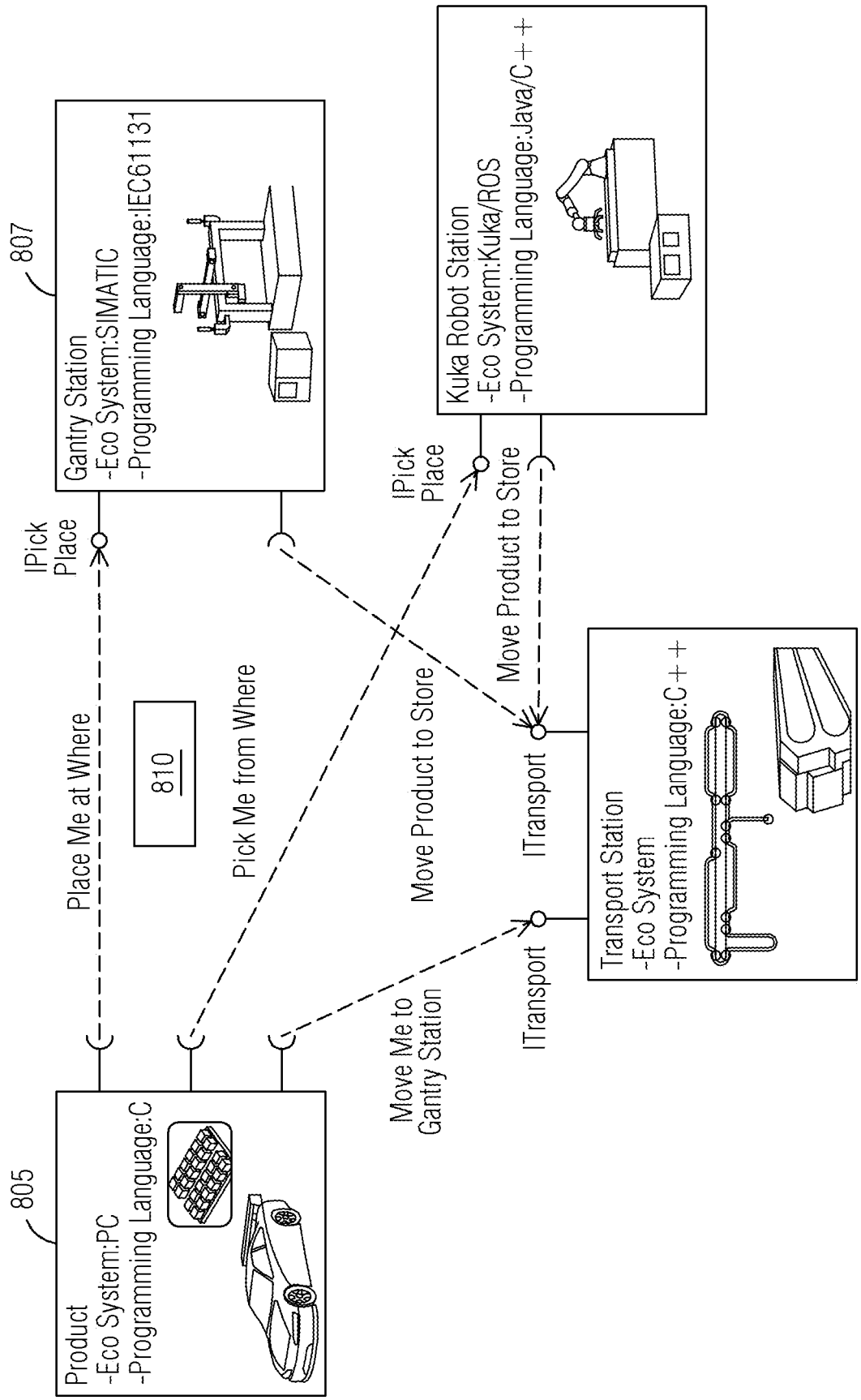
FIG. 8 illustrates an example implemented in an automation lab to demonstrate the gatekeeper function in accordance with an exemplary embodiment of the present invention.

With regard to FIG. 8, it illustrates an example implemented in an automation lab to demonstrate the gatekeeper function in accordance with an exemplary embodiment of the present invention. In this use case, a product 805 (e.g. a tray of cubes) interact with a transport system and Robots (e.g. Gantry 807) to sort the cubes on its tray. In our example, the Gantry robot OEM wants to charge the plant owner based on the operations executed on the Gantry 807. One can develop a transactional service (Interceptor) plugin (TS_CostPerGantryCommand). An interceptor plugin 810 will be injected between the original binding between the product 805 and the Gantry 807 plugins, as shown in the FIG. 9. In this plugin 810 component, the cost can be calculated based on each transaction, as each call to the Robot 807 is intercepted and processed by the plugin 810. Calculations may be performed based on the distance moved by the Robot 807 since all parameters of the interface are also intercepted by the plugin 810. Furthermore, the plugin 810 also detects if the command is executed successfully or not. Only successful commands are charged.

Figure 9:
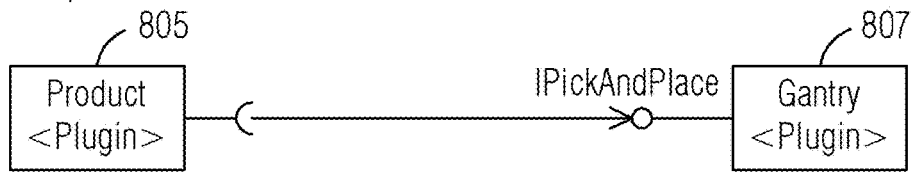
FIG. 9 illustrates shows that the service can be deployed during the testing phase and enabled during the operation phase without interrupting the development, testing and operation of the Product and Gantry logics in accordance with an exemplary embodiment of the present invention.
Figure 9:
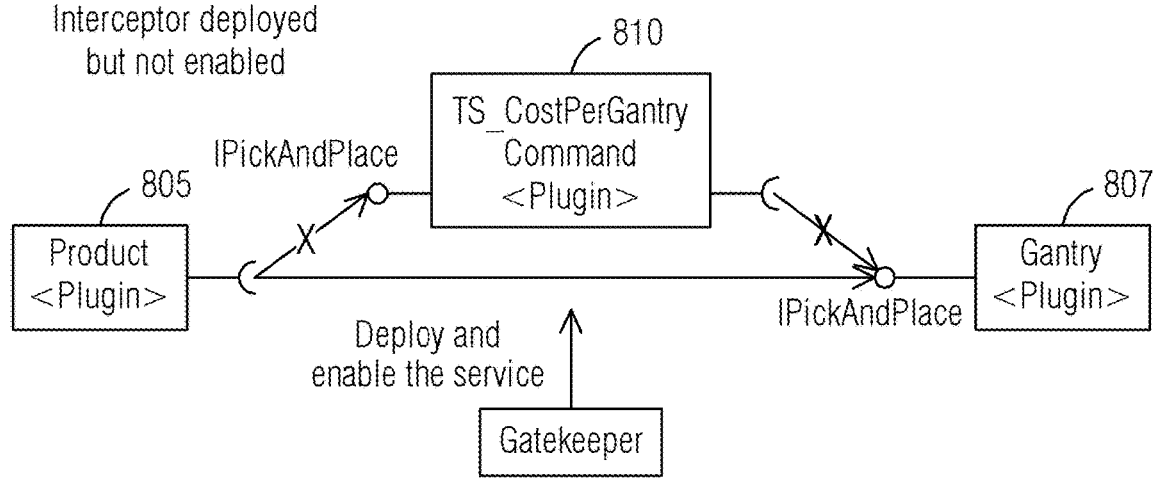
Figure 9:
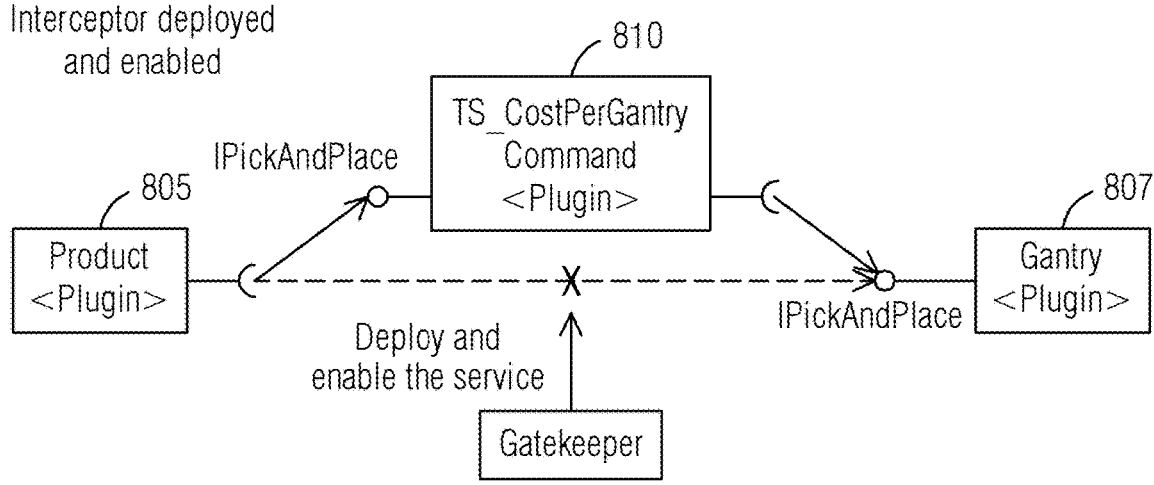

With respect to FIG. 9, it illustrates that a transactional service can be deployed during the testing phase and enabled during the operation phase without interrupting the development, testing and operation of the product 805 and Gantry 807 logics in accordance with an exemplary embodiment of the present invention.

Figure 10:
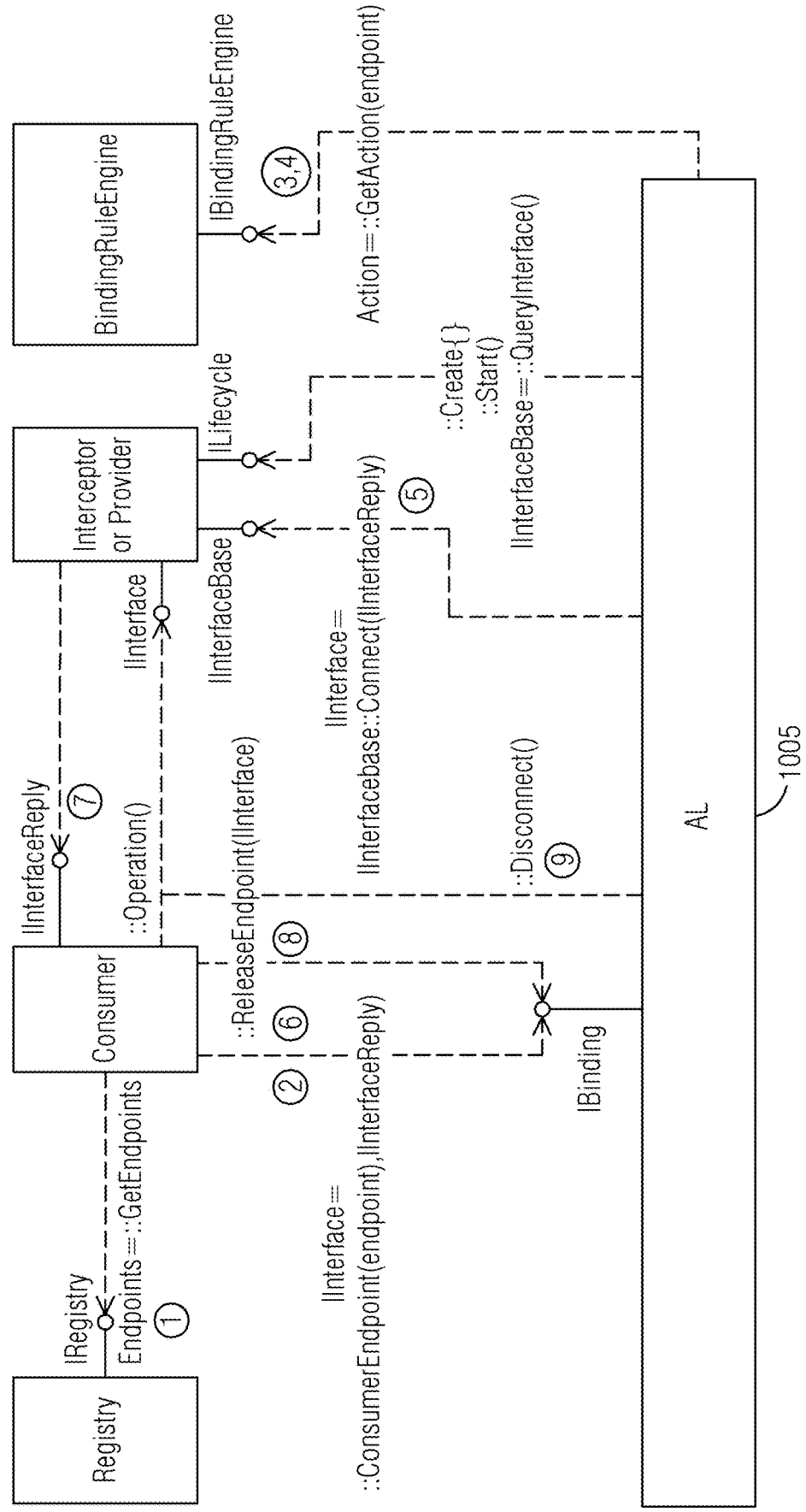
FIG. 10 shows how an Interceptor plugin interacts with a consumer and a provider plugin through Gatekeeper in AL (Abstraction Layer) in accordance with an exemplary embodiment of the present invention.

FIG. 10 shows how an Interceptor plugin interacts with a consumer and a provider plugin through Gatekeeper in AL (Abstraction Layer) 1005 in accordance with an exemplary embodiment of the present invention. The steps are: 0) in or after Ilifecycle::Start, 1) Consumer uses IRegistry::GetEndpoints to discover available endpoints, 2) consumer selects endpoint and invokes IBinding::ConsumeEndpoint to AL 1005, 3) AL 1005 forwards binding request to BindingRuleEngine, 4) BindingRuleEngine determines based on the endpoint description (interface, provider, properties) the action to be triggered e.g. add alternate endpoint (e.g. stub, access control), 5) AL 1005 executes action (e.g. addEndpoint) and binds to the provided endpoint (invocation of Ilifecycle::Query to IInterfaceBase and then IInterfaceBase:: Connect to get IInterface)=>mapping of endpoint description to callable Interface, 6) on success AL 1005 returns IInterface to the consumer, 7) Consumer starts using IInterface, 8) in or before ILifecycle::Stop Consumer invokes IBinding::ReleaseEndpoint, and 9) AL 1005 invokes Iinterface::Disconnect.

Figure 11:
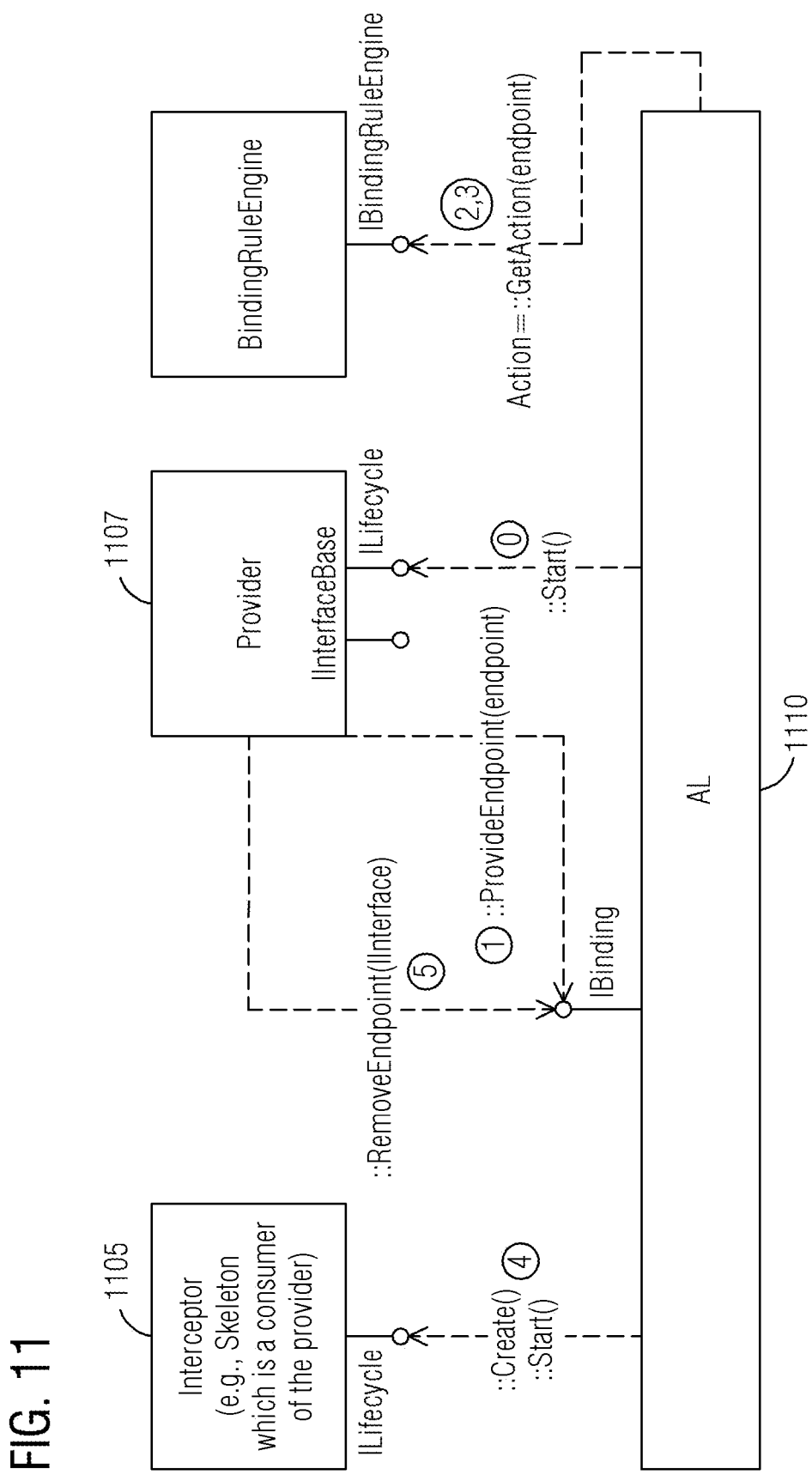
FIG. 11 shows how an Interceptor plugin interacts with a consumer and a provider plugin through Gatekeeper in AL (Abstraction Layer) in accordance with an exemplary embodiment of the present invention.

FIG. 11 shows how an interceptor plugin 1105 interacts with a consumer and a provider plugin 1107 through Gatekeeper in AL (Abstraction Layer) 1110 in accordance with an exemplary embodiment of the present invention.

The steps are: 0) in or after Ilifecycle::Start, 1) Provider invokes IBinding::ProvideEndpoint at AL 1110 with endpoint description, 2) AL 1110 forwards request to BindingRuleEngine, 3) BindingRuleEngine determines based on the endpoint description (interface, provider, properties) the action to be triggered e.g. add alternate endpoint (e.g. skeleton), 4) AL 1110 executes action (add plugIn and start plugIn with name provided by BindingRuleEngine, 5) in or before Ilifecycle::Stop provider can invoke Ibinding::RemoveEndpoint anytime Note: Rule Engine knows when to add or remove which plugIn (e.g. skeleton and its name, what Gateway), container executes it. Skeletons are plugIns which will register an endpoint with Registry and also consumes Igateway to enable interface invocations from messaging systems. Stubs are plugIns which consume IGateway and know how to map a specific interface invocation into a generic one. Gateways are ecosystem specific and know how to map an generic interface invocation to a messaging system. Ecosystem Discovery Import/Export moved into Gateway?

Figure 12:
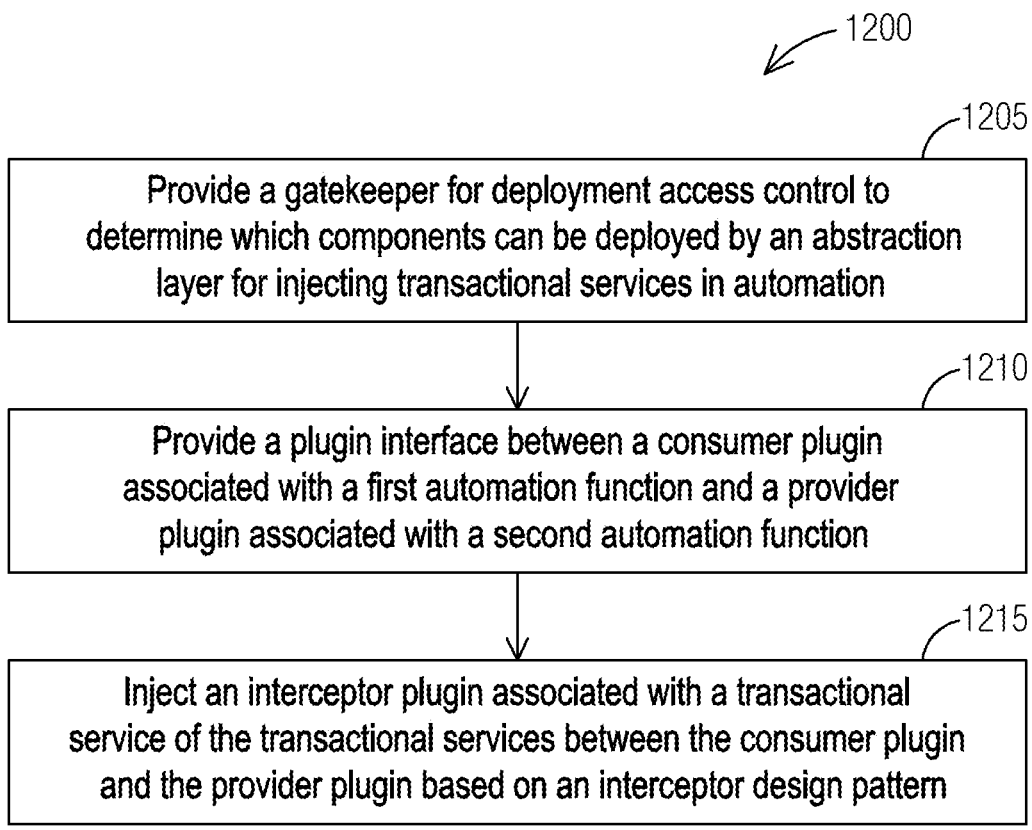
FIG. 12 illustrates a schematic view of a flow chart of a method for injecting transactional services in automation in accordance with an exemplary embodiment of the present invention.

FIG. 12 illustrates a schematic view of a flow chart of a method 1200 for injecting transactional services in automation in accordance with an exemplary embodiment of the present invention. Reference is made to the elements and features described in FIGS. 1-11. It should be appreciated that some steps are not required to be performed in any particular order, and that some steps are optional.

The method 1200 performed by an automation system comprises a step 1205 of providing a gatekeeper for deployment access control to determine which components can be deployed by an abstraction layer. The method 1200 further comprises a step 1210 of providing a plugin interface between a consumer plugin associated with a first automation function and a provider plugin associated with a second automation function. The method 1200 further comprises a step 1215 of injecting an interceptor plugin associated with a transactional service of the transactional services between the consumer plugin and the provider plugin based on an interceptor design pattern.

The method 1200 further comprises generating a plugin framework for the transactional services, wherein the generated transactional services to be dynamically deployed and enabled, disabled during operation and even per automation transaction. The method 1200 further comprises, in generated binding code of the transactional services and pre-integration, enabling insertion of interceptor plugins associated with the transactional services. The interceptor plugin is configured to expose the same interfaces from the provider plugin to the consumer plugin as originally provided and will consume the same interface from the provider plugin as originally provided.

Figure 13:
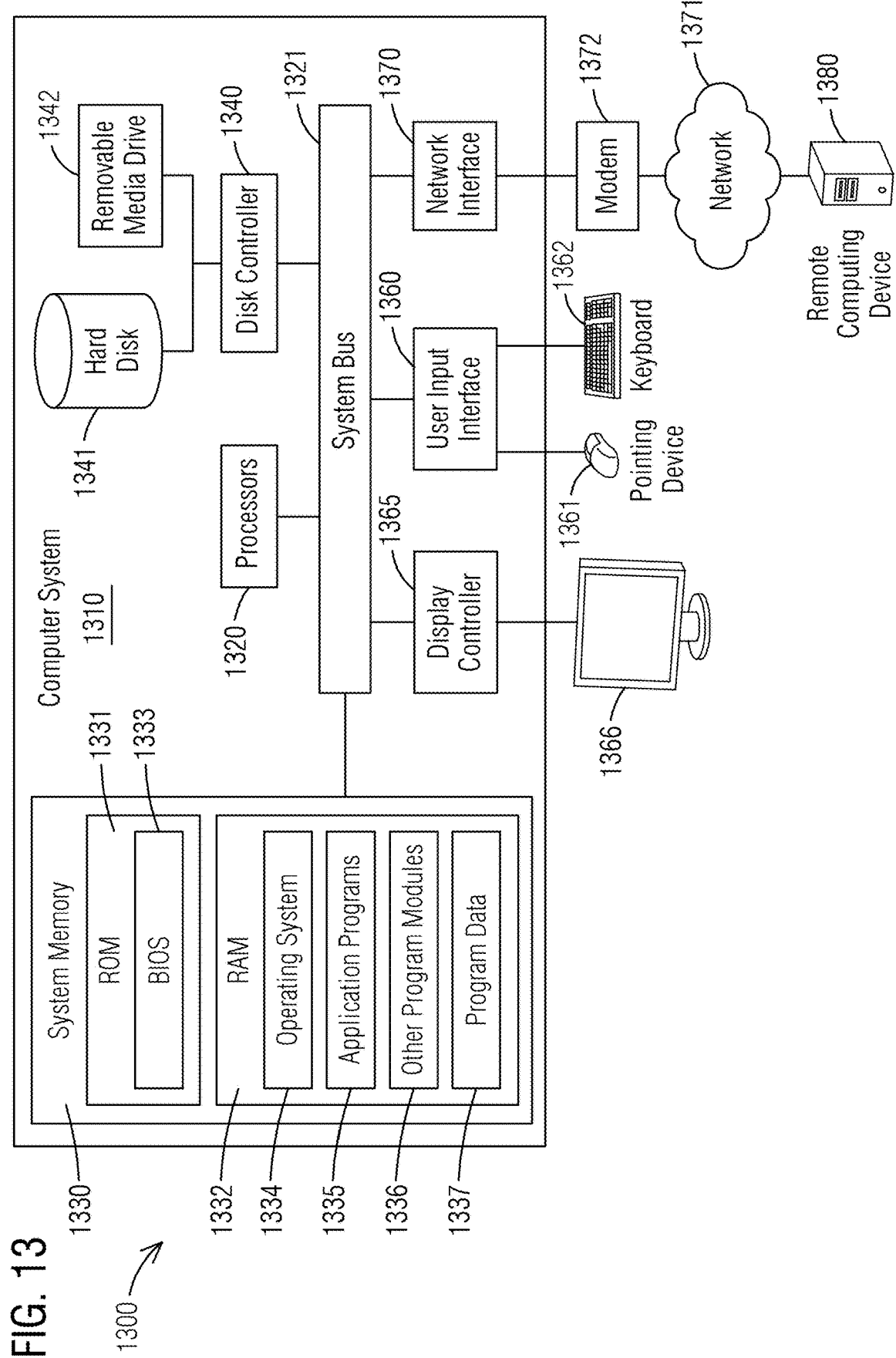
FIG. 13 shows an example of a computing environment within which embodiments of the disclosure may be implemented.

FIG. 13 shows an example of a computing environment within which embodiments of the disclosure may be implemented. For example, this computing environment 1300 may be configured to execute the automation system discussed above with reference to FIG. 1 or to execute portions of the method 1200 described above with respect to FIG. 12. Computers and computing environments, such as computer system 1310 and computing environment 1300, are known to those of skill in the art and thus are described briefly here.

As shown in FIG. 13, the computer system 1310 may include a communication mechanism such as a bus 1321 or other communication mechanism for communicating information within the computer system 1310. The computer system 1310 further includes one or more processors 1320 coupled with the bus 1321 for processing the information. The processors 1320 may include one or more central processing units (CPUs), graphical processing units (GPUs), or any other processor known in the art.

The computer system 1310 also includes a system memory 1330 coupled to the bus 1321 for storing information and instructions to be executed by processors 1320. The system memory 1330 may include computer readable storage media in the form of volatile and/or nonvolatile memory, such as read only memory (ROM) 1331 and/or random access memory (RAM) 1332. The system memory RAM 1332 may include other dynamic storage device(s) (e.g., dynamic RANI, static RANI, and synchronous DRAM). The system memory ROM 1331 may include other static storage device(s) (e.g., programmable ROM, erasable PROM, and electrically erasable PROM). In addition, the system memory 1330 may be used for storing temporary variables or other intermediate information during the execution of instructions by the processors 1320. A basic input/output system (BIOS) 1333 containing the basic routines that helps to transfer information between elements within computer system 1310, such as during start-up, may be stored in ROM 1331. RAM 1332 may contain data and/or program modules that are immediately accessible to and/or presently being operated on by the processors 1320. System memory 1330 may additionally include, for example, operating system 1334, application programs 1335, other program modules 1336 and program data 1337.

The computer system 1310 also includes a disk controller 1340 coupled to the bus 1321 to control one or more storage devices for storing information and instructions, such as a hard disk 1341 and a removable media drive 1342 (e.g., floppy disk drive, compact disc drive, tape drive, and/or solid state drive). The storage devices may be added to the computer system 1310 using an appropriate device interface (e.g., a small computer system interface (SCSI), integrated device electronics (IDE), Universal Serial Bus (USB), or FireWire).

The computer system 1310 may also include a display controller 1365 coupled to the bus 1321 to control a display 1366, such as a cathode ray tube (CRT) or liquid crystal display (LCD), for displaying information to a computer user. The computer system includes an input interface 1360 and one or more input devices, such as a keyboard 1362 and a pointing device 1361, for interacting with a computer user and providing information to the processor 1320. The pointing device 1361, for example, may be a mouse, a trackball, or a pointing stick for communicating direction information and command selections to the processor 1320 and for controlling cursor movement on the display 1366. The display 1366 may provide a touch screen interface which allows input to supplement or replace the communication of direction information and command selections by the pointing device 1361.

The computer system 1310 may perform a portion or all of the processing steps of embodiments of the invention in response to the processors 1320 executing one or more sequences of one or more instructions contained in a memory, such as the system memory 1330. Such instructions may be read into the system memory 1330 from another computer readable medium, such as a hard disk 1341 or a removable media drive 1342. The hard disk 1341 may contain one or more datastores and data files used by embodiments of the present invention. Datastore contents and data files may be encrypted to improve security. The processors 1320 may also be employed in a multi-processing arrangement to execute the one or more sequences of instructions contained in system memory 1330. In alternative embodiments, hard-wired circuitry may be used in place of or in combination with software instructions. Thus, embodiments are not limited to any specific combination of hardware circuitry and software.

As stated above, the computer system 1310 may include at least one computer readable medium or memory for holding instructions programmed according to embodiments of the invention and for containing data structures, tables, records, or other data described herein. The term "computer readable medium" as used herein refers to any medium that participates in providing instructions to the processor 1320 for execution. A computer readable medium may take many forms including, but not limited to, non-volatile media, volatile media, and transmission media. Non-limiting examples of non-volatile media include optical disks, solid state drives, magnetic disks, and magneto-optical disks, such as hard disk 1341 or removable media drive 1342. Non-limiting examples of volatile media include dynamic memory, such as system memory 1330. Non-limiting examples of transmission media include coaxial cables, copper wire, and fiber optics, including the wires that make up the bus 1321. Transmission media may also take the form of acoustic or light waves, such as those generated during radio wave and infrared data communications.

The computing environment 1300 may further include the computer system 1010 operating in a networked environment using logical connections to one or more remote computers, such as remote computer 1380. Remote computer 1380 may be a personal computer (laptop or desktop), a mobile device, a server, a router, a network PC, a peer device or other common network node, and typically includes many or all of the elements described above relative to computer system 1310. When used in a networking environment, computer system 1310 may include modem 1372 for establishing communications over a network 1371, such as the Internet. Modem 1372 may be connected to bus 1321 via user network interface 1370, or via another appropriate mechanism.

Network 1371 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 1310 and other computers (e.g., remote computer 1380). The network 1371 may be wired, wireless or a combination thereof. Wired connections may be implemented using Ethernet, Universal Serial Bus (USB), RJ-11 or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 1371.

In some embodiments, the computer system 1310 may be utilized in conjunction with a parallel processing platform comprising a plurality of processing units. This platform may allow parallel execution of one or more of the tasks associated with optimal design generation, as described above. For the example, in some embodiments, execution of multiple product lifecycle simulations may be performed in parallel, thereby allowing reduced overall processing times for optimal design selection.

The embodiments of the present disclosure may be implemented with any combination of hardware and software. In addition, the embodiments of the present disclosure may be included in an article of manufacture (e.g., one or more computer program products) having, for example, computer-readable, non-transitory media. The media has embodied therein, for instance, computer readable program code for providing and facilitating the mechanisms of the embodiments of the present disclosure. The article of manufacture can be included as part of a computer system or sold separately.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof.

Computer readable medium instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, may be implemented by computer readable medium instructions.

It should be appreciated that the program modules, applications, computer-executable instructions, code, or the like depicted in FIG. 13 as being stored in the system memory are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the computer system 1310, the remote device, and/or hosted on other computing device(s) accessible via one or more of the network(s), may be provided to support functionality provided by the program modules, applications, or computer-executable code depicted in FIG. 13 and/or additional or alternate functionality. Further, functionality may be modularized differently such that processing described as being supported collectively by the collection of program modules depicted in FIG. 13 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 13 may be implemented, at least partially, in hardware and/or firmware across any number of devices.

It should further be appreciated that the computer system 1310 may include alternate and/or additional hardware, software, or firmware components beyond those described or depicted without departing from the scope of the disclosure. More particularly, it should be appreciated that software, firmware, or hardware components depicted as forming part of the computer system 1310 are merely illustrative and that some components may not be present or additional components may be provided in various embodiments. While various illustrative program modules have been depicted and described as software modules stored in system memory, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While "transactional automation services" as "interceptors" are described here a range of one or more other number/types of services or other forms of services are also contemplated by the present invention. For example, other types of services may be implemented based on one or more features presented above without deviating from the spirit of the present invention.

The techniques described herein can be particularly useful for automation systems. While particular embodiments are described in terms of the automation system, the techniques described herein are not limited to automation system but can also be used with other systems.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A computer-implemented method of injecting transactional services in automation, the computer-implemented method performed by an automation system and comprising:
   through operating at least one processor:
   providing a gatekeeper for deployment access control to determine which components can be deployed by an abstraction layer;
   providing a plugin interface between a consumer plugin associated with a first automation function and a provider plugin associated with a second automation function; and
   injecting an interceptor plugin associated with a transactional service of the transactional services between the consumer plugin and the provider plugin based on an interceptor design pattern, wherein the gatekeeper manages deployment, injection, rejection, enabling, and disabling of the interceptor plugin between the consumer plugin and the provider plugin.

2. The computer-implemented method of claim 1, further comprising:
   generating a plugin framework for the transactional services, wherein generated transactional services are to be dynamically deployed and enabled or disabled during operation, and wherein dynamic deployment and enablement or disablement are deployed on a per automation transaction basis; and
   enabling insertion of interceptor plugins associated with the transactional services when generating binding code of the transactional services and during pre-integration,
   wherein the interceptor plugin is configured to expose a same interface from the provider plugin to the consumer plugin as originally provided and will consume the same interface from the provider plugin as originally provided.

3. The computer-implemented method of claim 1, wherein when the interceptor plugin is injected, an original binding is to be disabled and all future interactions are sent through the interceptor plugin.

4. The computer-implemented method of claim 1, wherein interception is at an interface level such that the transactional services are offered at a transactional level.

5. The computer-implemented method of claim 1, wherein the transactional services are overlaid and executed in a user defined order.

6. The computer-implemented method of claim 1, wherein a business logic of the transactional services is developed independently in a programming environment of a user's choice.

7. The computer-implemented method of claim 1, wherein the gatekeeper is configured to provide policy control per transaction during an automation operation.

8. The computer-implemented method of claim 1, wherein multiple interceptor plugins are deployed between plugins associated with automation functions.

9. The computer-implemented method of claim 8, wherein the multiple interceptor plugins are overlaid and applied in a given order defined by a user.

10. The computer-implemented method of claim 9, wherein the multiple interceptor plugins are managed by the gatekeeper.

11. The computer-implemented method of claim 1, wherein injecting an interceptor plugin further includes:
introducing a new service without stopping the first and second automation functions.

12. A computer-implemented method of injecting transactional services in automation, the computer-implemented method performed by an automation system and comprising:
through operating at least one processor:
providing a gatekeeper for deployment access control to determine which components can be deployed by an abstraction layer;
providing a plugin interface between a consumer plugin associated with a first automation function and a provider plugin associated with a second automation function; and
injecting an interceptor plugin associated with a transactional service of the transactional services between the consumer plugin and the provider plugin based on an interceptor design pattern, wherein the transactional service of the transactional services includes costs calculation, Quality of Service verification, security, safety, intellectual protection, performance, key performance indicator (KPI) calculation, versioning, diagnostic, prognostic, and tracing.

13. The computer-implemented method of claim 12, wherein the gatekeeper is configured to provide policy control such that a policy includes cost calculation per transaction, security policy, plugin deployment access control, intellectual protection, Quality of Service verification, safety check per transaction per operation, and user access control per transaction.

14. The computer-implemented method of claim 13, wherein the policy and the transactional service of the transactional services is categorized in a catalog and selected by the gatekeeper.

15. An automation system for injecting transactional services in automation, the automation system comprising:
a processor; and
an accessible memory storing an automation program comprising software instructions that, when executed by the processor, are configured to:
generate a plugin framework for the transactional services, wherein generated transactional services are to be dynamically deployed and enabled or disabled during operation, and wherein dynamic deployment and enablement or disablement are deployed on a per automation transaction basis;
enable insertion of interceptor plugins associated with the transactional services when generating binding code of the transactional services and during pre-integration;
provide a gatekeeper for deployment access control to determine which components can be deployed by an abstraction layer;
provide a plugin interface between a consumer plugin associated with a first automation function and a provider plugin associated with a second automation function; and
inject an interceptor plugin associated with a transactional service of the transactional services between the consumer plugin and the provider plugin based on an interceptor design pattern.

16. The automation system of claim 15, wherein the interceptor plugin is configured to expose a same interface from the provider plugin to the consumer plugin as originally provided and will consume the same interface from the provider plugin as originally provided.

17. The automation system of claim 15, wherein when the interceptor plugin is injected, an original binding is to be disabled and all future interactions are sent through the interceptor plugin.

18. A non-transitory computer readable medium encoded with instructions executable by at least one processor to operate one or more automation systems, the instructions comprising:
generating a plugin framework for the transactional services, wherein generated transactional services are to be dynamically deployed and enabled or disabled during operation, and wherein dynamic deployment and enablement or disablement are deployed on a per automation transaction basis;
enabling insertion of interceptor plugins associated with the transactional services when generating binding code of the transactional services and during pre-integration;
providing a gatekeeper for deployment access control to determine which components can be deployed by an abstraction layer;
providing a plugin interface between a consumer plugin associated with a first automation function and a provider plugin associated with a second automation function; and
injecting an interceptor plugin associated with a transactional service of the transactional services between the consumer plugin and the provider plugin based on an interceptor design pattern.

19. The non-transitory computer readable medium of claim 18, wherein the interceptor plugin is configured to expose a same interface from the provider plugin to the consumer plugin as originally provided and will consume the same interface from the provider plugin as originally provided.

* * * * *